No. 852,250. PATENTED APR. 30, 1907.
A. WILLIMAN.
ANIMAL POKE.
APPLICATION FILED DEC. 18, 1906.
2 SHEETS—SHEET 1.
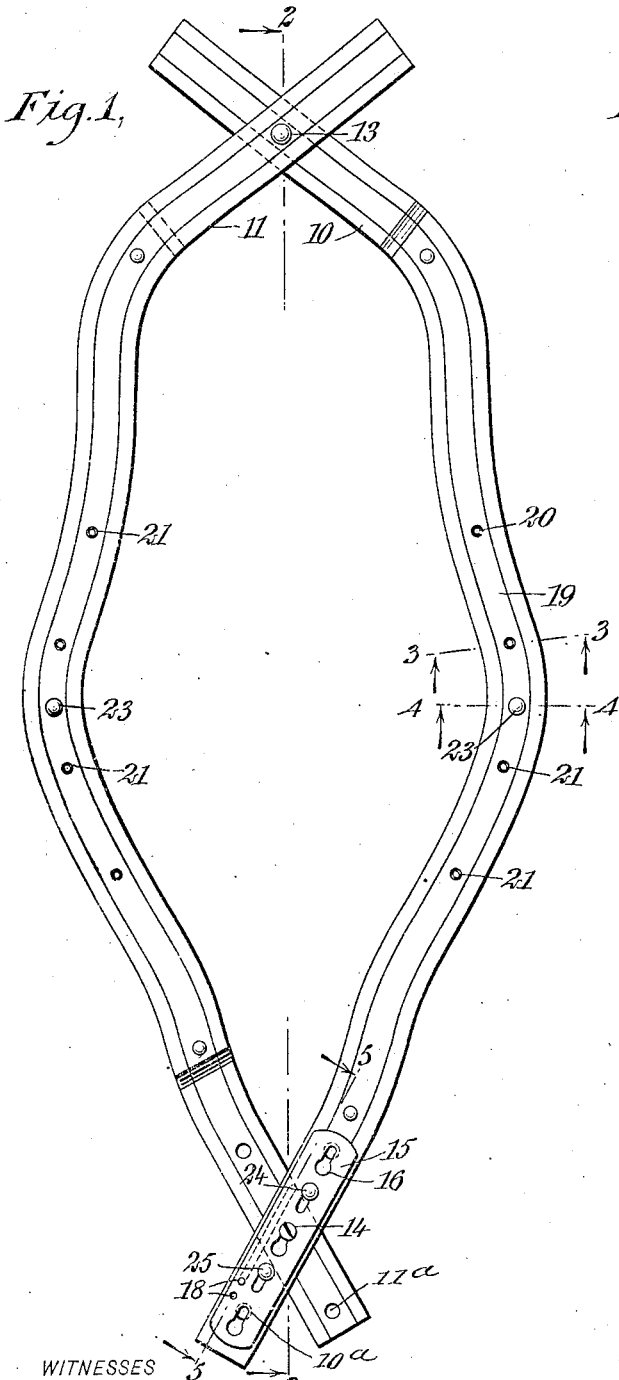
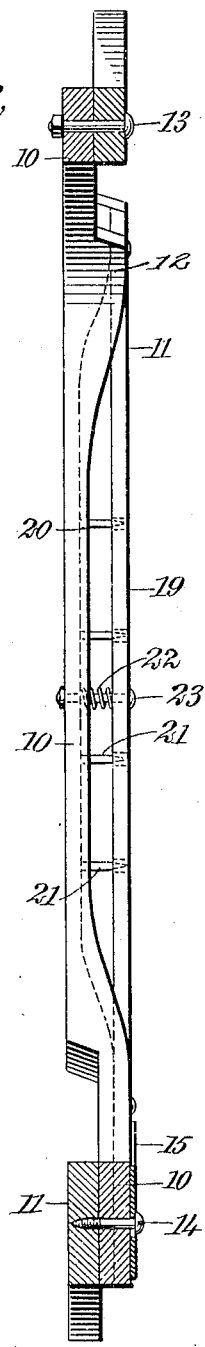
WITNESSES
Edward Thorpe,
INVENTOR
Anton Williman
BY Munn & Co
ATTORNEYS No. 852,250. PATENTED APR. 30, 1907.
A. WILLIMAN.
ANIMAL POKE.
APPLICATION FILED DEC. 18, 1906.

2 SHEETS—SHEET 2.

WITNESSES
Edw. Thorpe
C. R. Ferguson

INVENTOR
Anton Williman
BY Munn & Co
ATTORNEYS

UNITED STATES PATENT OFFICE.

ANTON WILLIMAN, OF WASHINGTON, MASSACHUSETTS.

ANIMAL-POKE.

No. 852,250.  Specification of Letters Patent.  Patented April 30, 1907.

Application filed December 18, 1906. Serial No. 348,379.

*To all whom it may concern:*

Be it known that I, ANTON WILLIMAN, a citizen of the United States, and a resident of Washington, in the county of Berkshire and State of Massachusetts, have invented a new and Improved Animal-Poke, of which the following is a full, clear, and exact description.

This invention relates to improvements in animal pokes or collars designed to prevent an animal from passing its head through a wire fence or the like with the intent of passing bodily through the fence, an object being to provide a device of this character, so constructed that under ordinary conditions it will not injure the animal but will slightly penetrate the animal's shoulders should it attempt to break through a fence.

I will describe an animal poke embodying my invention and then point out the novel features in the appended claims.

Reference is to be had to the accompanying drawings forming a part of this specification, in which similar characters of reference indicate corresponding parts in all the figures.

Figure 3:
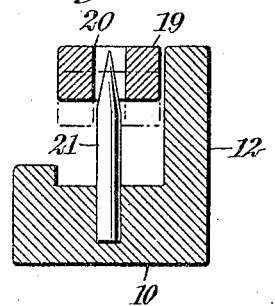
Figure 4:
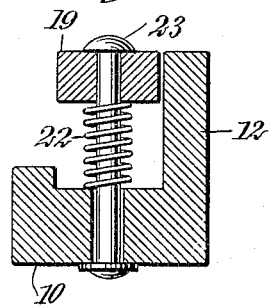
Figure 6:
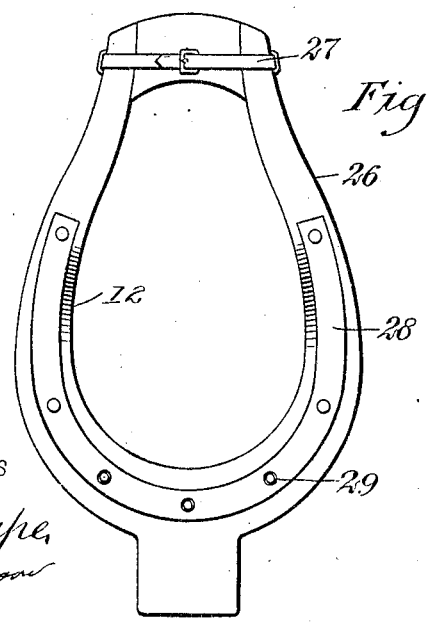
Figure 5:
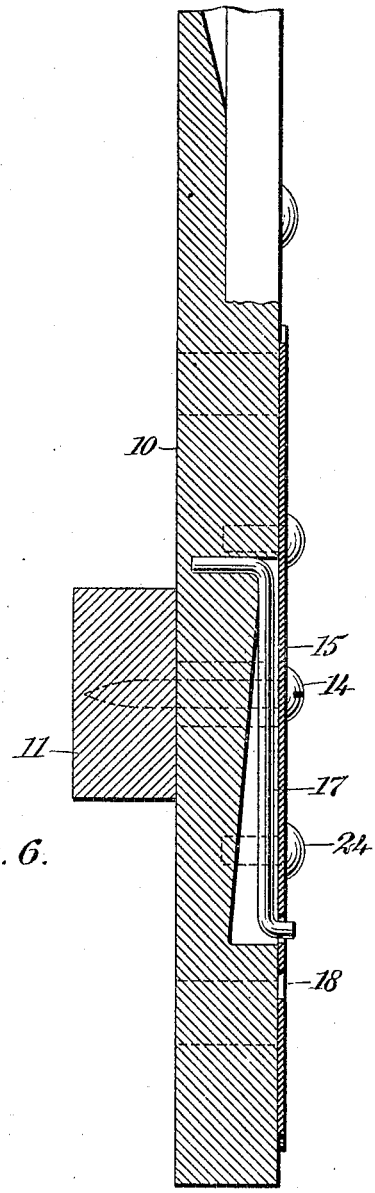

Figure 1 is an elevation of an animal poke embodying my invention; Fig. 2 is a section on the line 2—2 of Fig. 1; Fig. 3 is a section on the line 3—3 of Fig. 1; Fig. 4 is a section on the line 4—4 of Fig. 1; Fig. 5 is a section on the line 5—5 of Fig. 1; and Fig. 6 shows the device adapted for use on a horse.

It is to be understood that the poke is designed for use on cattle, horses, sheep, or other domestic animals.

The poke comprises side members 10, 11 which at the outer edges have inwardly disposed flanges 12. These members 10 and 11 are shaped to fit around an animal's neck and shoulders and they are pivotally connected together at the top, as indicated at 13. When in use on an animal, the lower ends of the members are crossed and locked together, and a means is provided for regulating the size of the yoke. As a means for regulating the size and locking the parts together at the lower end, one member, here shown as the member 11, is provided with a threaded stud 14 adapted to be screwed into one of a plurality of holes 11ª in the part 11, the stud being designed to pass through any one of a series of openings 10ª in the member 10, and on this member 10 is a locking plate 15 having openings 16 coincident with the openings through said member 10, and these openings 16 in the plate have enlarged portions at the end through which the head of the stud 14 may pass, and when the plate is slid downward, the shank of the stud will engage in the narrow portion of the slot or opening.

The locking plate is held in position by means of a spring 17 secured to the member 10 and having an outwardly extended portion at its free end for engaging in either one of the openings 18 formed in the locking plate. Extended longitudinally on each member 10 and 11 is a shield or guard strip 19 which is secured at its ends to the member and arranged inward of the flange 12. The shields are provided with perforations 20 into which puncturing prongs 21 extend, the said prongs being attached to the members 10 and 11, as clearly indicated in Fig. 2, and under ordinary conditions the points of the prongs are wholly within the perforations in the shields, and the shields are held yieldingly outward by means of springs 22 which surround bolts 23 and engage at one end with the shields and at the other end with said side members, the bolts 23 being rigidly secured to the side members and passing loosely through openings in the shields.

When adjusted to an animal's neck, the side members are prevented from swinging with relation to each other by means of a pin 24 passed through an opening 16 and engaging with the inner side or edge of the member 11, as shown in Fig. 1, and if necessary another pin 25 may be passed through an opening 16 to engage with the outer edge of said member 11.

For use on a horse I employ the poke illustrated in Fig. 6 which indicates a collar 26 secured together on the top by means of a strap 27, and extending around the lower portion of the collar and conformed thereto is a spring-yielding plate 28 having openings through which puncturing devices 29 may pass.

In the operation the poke is placed on the animal's neck with the puncturing devices extended toward the body. Should an animal attempt to pass his head through a fence or the like, the shields 19 will be depressed so that the puncturing devices will enter the animal's skin but not sufficiently to injure the same.

Having thus described my invention, I claim as new and desire to secure by Letters Patent:

1. An animal poke, comprising a collar, puncturing devices carried by the collar, and a guard plate having its ends secured to the collar and provided with openings for permitting the passage of the puncturing devices said collar having a flange on its inner edge for guiding the guard plate.

2. An animal poke, comprising side members longitudinally curved and pivotally connected together at the top, means for locking the lower ends of the members together, puncturing devices carried by the members, guard plates having their ends secured to said side members and having perforations, puncturing devices extended from the side members into said perforations, and springs arranged between the side members and the guards.

3. An animal poke comprising side members pivotally connected at their upper ends, a stud for engaging in the lower end of one of said members, the other member having a plurality of perforations, a plate movable on said other member and having openings having enlargements at one end, a locking device for said plate, puncturing devices carried by said side members, and spring yielding guards attached to the side members and having perforations for receiving the puncturing devices.

In testimony whereof I have signed my name to this specification in the presence of two subscribing witnesses.

ANTON WILLIMAN.

Witnesses:
 FRED W. STRAY,
 HENRY M. KIRTLAND.